(12) United States Patent
Endres et al.

(10) Patent No.: US 10,287,719 B2
(45) Date of Patent: May 14, 2019

(54) APPARATUS AND METHOD FOR PROVIDING REINFORCEMENT STRAND LOOPS

(71) Applicants: AIRBUS DEFENCE AND SPACE GMBH, Taufkirchen (DE); AIRBUS OPERATIONS GMBH, Hamburg (DE)

(72) Inventors: Gregor Endres, Pfaffenhofen/Ilm (DE); Hans-Juergen Weber, Verden (DE)

(73) Assignees: Airbus Defence and Space GmbH, Taufkirchen (DE); Airbus Operations GmbH, Hamburg (DE)

( * ) Notice: Subject to any disclaimer, the term of this patent is extended or adjusted under 35 U.S.C. 154(b) by 23 days.

(21) Appl. No.: 15/487,001

(22) Filed: Apr. 13, 2017

(65) Prior Publication Data

US 2017/0284005 A1 Oct. 5, 2017

Related U.S. Application Data

(63) Continuation of application No. PCT/EP2015/073772, filed on Oct. 14, 2015.

(30) Foreign Application Priority Data

Oct. 14, 2014 (DE) .................. 10 2014 014 961

(51) Int. Cl.
*D05C 15/20* (2006.01)
*B29C 70/08* (2006.01)
(Continued)

(52) U.S. Cl.
CPC ............ *D05C 15/20* (2013.01); *B29C 70/086* (2013.01); *B29C 70/24* (2013.01); *B29K 2105/04* (2013.01)

(58) Field of Classification Search
CPC ........ D05C 15/20; D05C 17/20; D05C 15/18; B29C 70/08; B29C 70/086
See application file for complete search history.

(56) References Cited

U.S. PATENT DOCUMENTS 3,030,256 A * 4/1962 Rosenthal ............... E04C 2/205
156/148
4,506,611 A * 3/1985 Parker .................... D05B 23/00
112/198

(Continued)

FOREIGN PATENT DOCUMENTS

DE 102007033869 A1 1/2009
DE 102009050904 A1 4/2011

(Continued)

OTHER PUBLICATIONS

IPRP with Written Opinion for Application No. PCT/EP2015/073772 dated Apr. 18, 2017.

(Continued)

*Primary Examiner* — Danny Worrell
(74) *Attorney, Agent, or Firm* — Jenkins, Wilson, Taylor & Hunt, P.A.

(57) ABSTRACT

A device for providing reinforcement strand loops for a multi-needle system for mechanically reinforcing a component made of a foamed plastics material, has a profile body, at least two clamps positioned on the periphery and/or end face of the profile body for fixing a reinforcement strand to the profile body, at least one slider which can be moved in parallel with a central longitudinal axis of the profile body to produce a reinforcement strand loop, at least two separators positioned in the periphery and/or end face of the profile body for separating the reinforcement strand loop from the reinforcement strand and a feeder for feeding the reinforcement strand loop. As a result, reinforcement strand (Continued)

loops can be produced with high precision and individually presented to the needles and/or grippers of a multi-needle system.

20 Claims, 5 Drawing Sheets

(51) Int. Cl.
*B29C 70/24* (2006.01)
*B29K 105/04* (2006.01)

(56) References Cited

U.S. PATENT DOCUMENTS

| | | | | |
|---|---|---|---|---|
| 5,515,798 | A * | 5/1996 | Cahuzac | D04H 18/00 112/224 |
| 5,543,005 | A * | 8/1996 | Monget | B29C 70/228 112/412 |
| 8,307,621 | B2 | 11/2012 | Weber et al. | |
| 9,289,927 | B2 * | 3/2016 | Weber | B29C 44/56 |
| 9,945,058 | B2 * | 4/2018 | Endres | B29C 70/24 |
| 2005/0006023 | A1 * | 1/2005 | Johnson | B29C 70/086 156/92 |
| 2008/0226876 | A1 * | 9/2008 | Roth | B29C 70/086 428/172 |
| 2009/0229761 | A1 * | 9/2009 | Joern | B29B 11/16 156/433 |
| 2015/0322608 | A1 | 11/2015 | Endres et al. | |
| 2017/0284005 | A1 * | 10/2017 | Endres | D05C 15/20 |

FOREIGN PATENT DOCUMENTS

| | | |
|---|---|---|
| DE | 102009050906 A1 | 5/2011 |
| DE | 102012023815 A1 | 6/2014 |
| WO | WO 2013/029121 A1 | 3/2013 |

OTHER PUBLICATIONS

German Office Action for Application No. 102014014961 dated May 13, 2015.
International Search Report for Application No. PCT/EP2015/073772 dated Dec. 23, 2015.

* cited by examiner

APPARATUS AND METHOD FOR PROVIDING REINFORCEMENT STRAND LOOPS

CROSS-REFERENCE TO RELATED APPLICATIONS

This application is a continuation of and claims priority to PCT/EP2015/073772 filed Oct. 14, 2015 which claims the benefit of and priority to German Patent Application No. 10 2014 014 961.7 filed Oct. 14, 2014, the entire disclosures of which are incorporated by reference herein.

TECHNICAL FIELD

The disclosure herein firstly relates to a device for providing reinforcement strand loops for a multi-needle system for mechanically reinforcing a component made of a foamed plastics material.

Furthermore, the disclosure herein relates to a method for providing reinforcement strand loops for a multi-needle system for mechanically reinforcing a component made of a foamed plastics material, in particular by a device according to the disclosure herein.

BACKGROUND

Foam-reinforcement technologies (Sting-Tech™) for mechanically reinforcing components made of foamed plastics materials are known from the prior art. The reinforcement can be carried out for example using reinforcement strands composed of bundled carbon fibers or carbon-fiber filaments, or of carbon fibers or carbon fiber filaments otherwise arranged in a three-dimensional manner. For this purpose, reinforcement strand loops formed from the reinforcement strand are pulled through the component made of the foamed plastics material by needles. Subsequently, the two sides of the for example planar component are provided with cover layers. Components of this kind have an extraordinarily high mechanical resistance combined with a low weight and, at the same time, have an outstanding impact tolerance by comparison with other core structures. Nowadays, components of this kind comprising reinforced foamed plastics materials can be produced by single-needle and multi-needle systems using suitable reinforcement strands cost-effectively and in a manner suitable for large-scale production.

Multi-needle systems of this type currently use an individual reinforcement strand as the model for all the needles or the "grippers". As a result, it is not necessary to have a separate reinforcement strand available for each individual needle, which substantially simplifies construction. Under certain conditions, such as in the case of an overly high internal stress of the reinforcement strand, overly short processing times or an overly high sensitivity of the reinforcement strand used, however, it is no longer possible to use a single reinforcement strand to form loops.

SUMMARY

It is therefore an idea of the disclosure herein to indicate a device which is spatially compact, easy to integrate, reliable and quick to synchronize, and which makes it possible to provide each needle of a multi-needle system with an individual reinforcement strand loop for reinforcing foamed material. Furthermore, it is an idea of the disclosure herein to indicate a method for the efficient operation of a device of this kind.

This idea is implemented by a device comprising:
a. a profile body,
b. at least two clamps positioned on the periphery and/or end face of the profile body for fixing a reinforcement strand to the profile body,
c. at least one slider which can be moved in parallel with a central longitudinal axis of the profile body to produce a reinforcement strand loop,
d. at least two separators positioned in the periphery and/or end face of the profile body for separating the reinforcement strand loop from the reinforcement strand, and
e. a feeder for feeding the reinforcement strand loop.

As a result, reinforcement strand loops can be produced with precisely reproducible dimensions at high speed and provided to a multi-needle system. In addition, the device has a simple and robust construction. Furthermore, the device can be produced so as to be spatially compact so that it can easily be integrated in existing multi-needle systems.

In the case of a technical development, the profile body can be rotated about the central longitudinal axis. On account of the profile body, which can preferably be rotated in relation to the stationary slider, the structure is simple. Alternatively, the slider can be designed in such a way that it revolves or circles about the profile bodies which are stationary in this type of configuration.

In another embodiment, the profile body can be rotated about the central longitudinal axis thereof in angular steps of 360°/n, n being a natural number which is greater than or equal to two. As a result, the profile body is always located in a spatially defined position relative to the multi-needle system, which position can be precisely reproduced by repeated rotations by angular steps. Generally, the variable n corresponds to the number of lateral faces or longitudinal edges of the profile body.

According to a further development, in a resting position, the separators are flush with the profile body and, in an operating position, protrude from the profile body at least in part. As a result, mechanical damage to the reinforcement strand, at least some portions of which are in contact with the peripheral surface of the profile body, is prevented.

According to another embodiment, a clamping unit, in particular for homogenizing the mechanical stress of the reinforcement strand, is assigned to the feeder. As a result, the reinforcement strand fed to the device is prevented from sagging in a slack manner.

In another development, it is provided for the clamps to be actuable by an eccentric. As a result, a simple and mechanically reliable activation of the clamps is ensured. In the case of a plurality of devices arranged in parallel, the eccentrics thereof can be driven by a vertical shaft. Alternatively or additionally, a completely autonomous activation of at least individual clamps can take place.

In another embodiment of the device, it is provided for at least one additional clamp to be arranged on the periphery of the profile body. As a result, a (new) start of the reinforcement strand can be fixed to the profile body to produce the next reinforcement strand loop.

In a first embodiment of the device:
a. the profile body has an approximately straight prismatic shape having at least three lateral faces;

b. each of the at least three lateral faces comprises a recess, which extends through the center thereof and in parallel with the central longitudinal axis, for receiving the slider at least in part;
c. in each case, two clamps are positioned on the profile body on both sides of each recess; and
d. at least one separator is integrated in the region of each of the at least three longitudinal edges of the profile body.
e. On account of this configuration, smaller angular steps of 360°/n, in which n corresponds to the number of lateral faces of the profile body, and thus quick synchronization of the device are possible.

In a second embodiment of the device:
a. the profile body has an approximately cuboid shape;
b. each of two long sides of the profile body comprises a recess, which extends through the center thereof and in parallel with the central longitudinal axis, for receiving the slider at least in part;
c. in each case, two clamps are positioned on the profile body in the region of each long side on both sides of each recess; and
d. in each case, at least one separator is integrated in each short side of the profile body.

As a result, the device has a particularly simple structure which requires a lower number of clamps and separators.

In a third embodiment of the device:
a. the profile body has an approximately cylindrical shape;
b. the profile body comprises two diametrically arranged recesses, which extend in parallel with the central longitudinal axis, for receiving the slider at least in part;
c. two clamps are positioned on the profile body in each case on both sides of each of the recesses; and
d. a separator is integrated in the profile body in each case between two adjacent clamps.

As a result, the profile body can be produced with particularly low production complexity, a particularly high symmetry with respect to the central longitudinal axis thereof being achieved at the same time.

In a fourth embodiment of the device:
a. the profile body has an approximately straight prismatic shape having at least three lateral faces;
b. each of the at least three lateral faces comprises a recess, which extends through the center thereof and in parallel with the central longitudinal axis, for receiving the slider at least in part;
c. in each case, two clamps are positioned on an end face of the profile body on both sides of each recess; and
d. at least one separator is integrated in the region of each of the at least three corners of the end face of the profile body.

In this embodiment of the device, the reinforcement strand can more easily be introduced into the clamps and guided therethrough.

Furthermore, the idea of the disclosure herein is implemented by a method for providing reinforcement strand loops for a multi-needle system for mechanically reinforcing a component made of a foamed plastics material, in particular by a device comprising the following steps:
a. fixing a first branch of the reinforcement strand loop to be formed to the profile body by a first clamp;
b. moving the slider in parallel with the central longitudinal axis of the profile body to produce the reinforcement strand loop;
c. fixing a second branch of the reinforcement strand loop to the profile body by another clamp which is positioned on the periphery of the profile body at a distance from the first clamp;
d. separating the reinforcement strand which is clamped between the clamps to produce the reinforcement strand loop by the at least one separator in such a way that a needle and/or a gripper of the multi-needle system can receive the reinforcement strand loop;
e. tracking the reinforcement strand;
f. repeating steps a to e.

As a result, reinforcement strand loops can be produced at high speed and with high dimensional accuracy and presented to a multi-needle system. Generally, the variable n corresponds to the number of lateral faces or longitudinal edges of the profile body.

In the case of a further development, in order to track the reinforcement strand in method step e, the profile body is rotated by an angular step of 360° divided by n whilst simultaneously pulling the reinforcement strand off a feeder, n being a natural number which is greater than or equal to 2. As a result, a profile body comprising n lateral faces, after n angular steps, is always located back in the starting or basic position thereof in relation to the multi-needle system.

According to another embodiment, in method step d, the reinforcement strand is fixed to the profile body by at least one additional clamp before the separation. As a result, a (new) start of the reinforcement strand is secured to the profile body to form the next reinforcement strand loop.

In a further development of the method, an axial path of the slider starting from the resting position thereof up to the point where the slider reaches the operating position is adjusted in such a way that a reinforcement strand loop is produced with a predetermined length. As a result, reinforcement strand loops can be produced for components having a locally varying material thickness. In this case, the effective length of a reinforcement strand loop corresponds approximately to half of the portion separated from the reinforcement strand.

BRIEF DESCRIPTION OF THE DRAWINGS

In the drawings, the same structural elements each have the same reference sign.

In the drawings.

DETAILED DESCRIPTION

Figure 1:
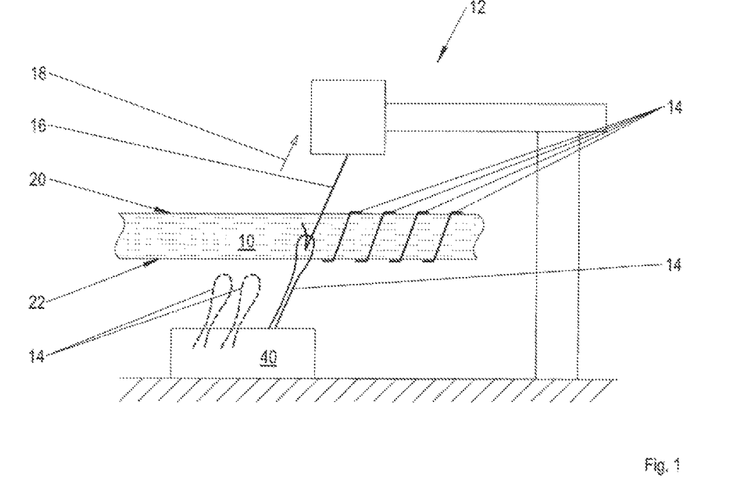
FIG. 1 is a schematic view of a multi-needle system for reinforcing a foamed plastics material component with reinforcement strand loops by a device according to the disclosure herein.

FIG. 1 is a schematic view of a multi-needle system for reinforcing a foamed plastics material component with reinforcement strand loops by a device according to the disclosure herein.

A component 10 made of a foamed plastics material is reinforced with a plurality of reinforcement strand loops 14 by a multi-needle system 12. For this purpose, the multi-needle system 12 pulls at least one reinforcement strand loop 14 through the component 10 in the direction of the black arrow 18 by the just one needle 16 shown here, unlabelled ends of the reinforcement strand loops being placed on or otherwise fixed to the upper face 20 and the lower face 22 of the component 10. The reinforcement strand loops 14 are presented to the multi-needle system 12 by the device 40 according to the disclosure herein. The reinforcement strand loops 14 can be for example rovings composed of bundled or braided carbon fibers. Alternatively, narrow strip-shaped or strand-shaped reinforcement strand loops, composed for example of woven, braided, plied, twisted or tubular knitted carbon fibers or other spatial arrangements of carbon fibers, can also be used.

In another production step (not shown), cover layers (optionally not shown) made of a fiber-reinforced plastics material can be applied to the upper face 20 and the lower face 22 of the component 10, as a result of which a mechanically heavy-duty join is produced between the component 10 made of the foamed plastics material, the reinforcement strand loops 14 and the cover layers.

Figure 2:
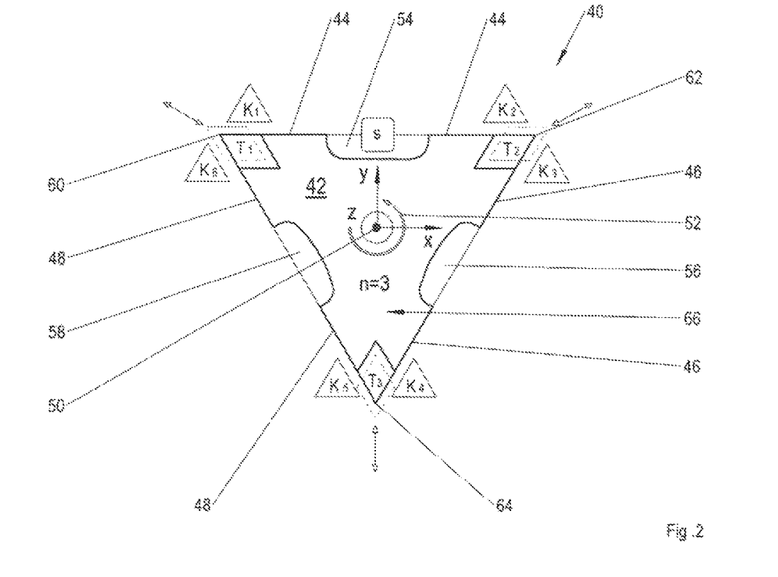
FIG. 2 is a highly schematic plan view of a first embodiment of the device.

FIG. 2 is a highly schematic plan view of a first embodiment of the device. A first embodiment of a device 40 according to the disclosure herein has inter alia a profile body 42 having a regular prismatic shape with in this case, by way of example, n equals three lateral faces 44, 46, 48, which results in a cross-sectional geometry which corresponds to that of an equilateral triangle. The profile body 42 can be rotated about a central longitudinal axis 50 which in this case, by way of example, coincides with the z-axis of an unlabelled coordinate system, starting from the shown horizontal (basic) position in discrete angular steps in the direction of an arrow of rotation 52. The size of the angular steps is in each case 360° divided by n, n corresponding to the number of the lateral faces 44, 46, 48, in this case therefore equal to the natural number three. As a result, after each angular step of 120°, one of the lateral faces 44, 46, 48 extends in parallel with the zx-plane of the coordinate system. By increasing n, for example a straight profile body having a greater number of lateral faces can be produced which has a uniform polygonal cross-sectional geometry. In principle, in the case of a prismatic profile body, the variable n can be any natural number which is greater than or equal to three.

A continuous recess 54, 56, 58 is located in the center of each lateral face 44, 46, 48, which recess is used to receive a slider S which can be moved in parallel with the central longitudinal axis 50. The slider S, which is stationary in relation to the profile body 42 except for the axial movability thereof, is required to produce the reinforcement strand loops. The slider S can have a cross-sectional geometry which deviates from the rectangular cross-sectional geometry shown here merely by way of example. The recesses 54, 56, 58 preferably extend over a height H (not drawn here) of the profile body 42 in the direction of the z-axis, i.e. the recesses 54, 56, 58 are formed so as to be continuous in relation to the longitudinal extension of the profile body 42 and can have a cross-sectional geometry which deviates from the curved concave cross-sectional geometry shown here (cf. in particular FIGS. 4 and 5).

On both sides of the three recesses 54, 56, 58 and on both sides of three longitudinal edges 60, 62, 64, in each case, two clamps $K_{1,2}$, $K_{3,4}$ and $K_{5,6}$ are arranged on the periphery of the lateral faces 44, 46, 48, which clamps are used to fix a reinforcement strand (not shown here) which, in the case of this embodiment, is placed on the periphery of the profile body 42. In this case, the clamp pairs $K_{6,1}$, $K_{2,3}$ and $K_{4,5}$ are immediately adjacent to one another on the periphery and are separated from one another only by the longitudinal edges 60, 62, 64. In principle, the clamps $K_{1, \ldots, 6}$ can be designed having any desired structure as long as damage to the reinforcement strand which is fixed to the profile body 42 by the clamps is not possible.

In the region of the three longitudinal edges 60, 62, 64, in each case, a separator $T_{1,2,3}$ is additionally integrated in the profile body 42. The three separators $T_{1,2,3}$ for separating the reinforcement strand into portions are preferably located inside the profile body 42, i.e. underneath the end face 66 which is only visible here. The separators $T_{1,2,3}$ can be produced by any desired cutting technology, such as blades and abutment technology, two movable scissor blades, rotating diamond wheels, etc. Furthermore, the reinforcement strand can be separated from the rest of the reinforcement strand for example by high-pressure water jet cutting or, in the case of non-flammable reinforcement strands, optionally by laser-beam cutting or hot-wire cutting, in order to produce the reinforcement strand loops.

In order to operate the separators $T_{1,2,3}$, the separators are for example, as indicated in each case by the three small black double arrows and the dotted outlines of the separators $T_{1, \ldots, 3}$, radially extended and retracted relative to the z-axis of the coordinate system. In the resting position of the separators $T_{1,2,3}$ indicated by dashed lines, the separators are flush with the profile body 42, whereas in the operating position thereof for separating a reinforcement strand loop, which position is indicated by dotted lines, the three separators $T_{1,2,3}$ protrude from the profile body 42.

The activation of the, in this case, by way of example, six clamps $K_{1, \ldots, 6}$ and of the three separators $T_{1,2,3}$ occurs by at least one eccentric (not shown) according to the rotational position of the profile body 42 relative to the z-axis in each case. In the multi-needle system 12, by a plurality of devices 40 constructed in the same manner, a plurality of reinforcement strand loops can be produced and presented simultaneously, it being possible for the clamps and the separators of the individual devices to be synchronously controlled by a vertical shaft. Alternatively or additionally, individual activation of at least one clamp $K_{1, \ldots, 6}$ and/or at least one separator $T_{1,2,3}$ is also possible, a corresponding number of electromechanical actuators, which are activated by an electronic open and/or closed-loop control unit, being provided. In principle, depending on the realisable dimensions of the profile body 42 and the number of lateral faces and longitudinal edges, a highly variable number of clamps K and separators T can be provided. When n is the number of lateral faces of the regular prismatic profile body 42, generally $n \geq 3$ separators and $n \geq 2*n$ clamps are present on the profile body 42.

The number n of lateral faces of a prismatic profile body of the device 40 is ultimately limited only by the number of clamps and separators to be controlled and the mechanical complexity required thereby, and by the size of the total installation space available for the components. A greater n allows smaller angular steps during the rotation of the profile body, and therefore, by the device, reinforcement strand loops can be produced and presented in shorter cycles.

Figure 3:
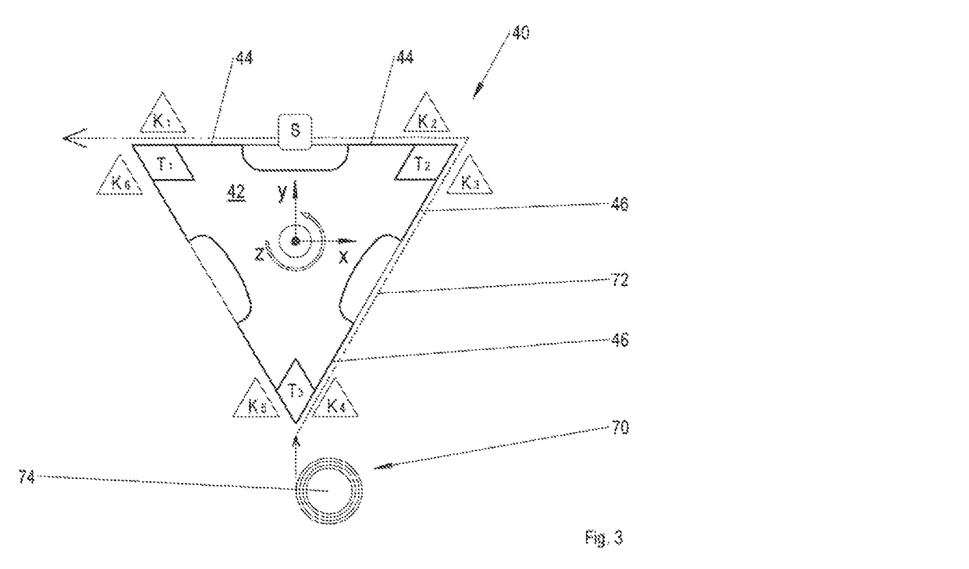
FIG. 3 shows the device from FIG. 2 with a threaded reinforcement strand.

FIG. 3 shows the device from FIG. 2 with a threaded reinforcement strand. The device 40 further comprises a feeder 70 (not drawn in FIG. 2) for automatically feeding a continuous reinforcement strand 72. In the angular position shown of the profile body 42, relative to the coordinate system, the reinforcement strand 72 is threaded by way of example between the lateral face 46 and the clamps $K_{3,4}$, and between the lateral face 44 and the clamps $K_{1,2}$, all the clamps $K_{1,\ldots,6}$ remaining in the raised and detached position from FIG. 2. In the case where, for example, one of the clamps $K_{1,\ldots,4}$ is tightened, in each angular step of 120° of the profile body 42, the reinforcement strand 72 is automatically removed from a supply spool 74 of the feeder 70 and placed on the lateral faces 44, 46. The feeder 70 further comprises a clamping unit (not shown) which, in the simplest case, is a brake for influencing the speed of the supply spool 74 during removal of the reinforcement strand 72. On account of the clamping unit, a taut, rectilinear path of the reinforcement strand 72 is always ensured when removing the strand, the reinforcement strand 72 always being under defined and constant internal mechanical stress.

Figure 4:
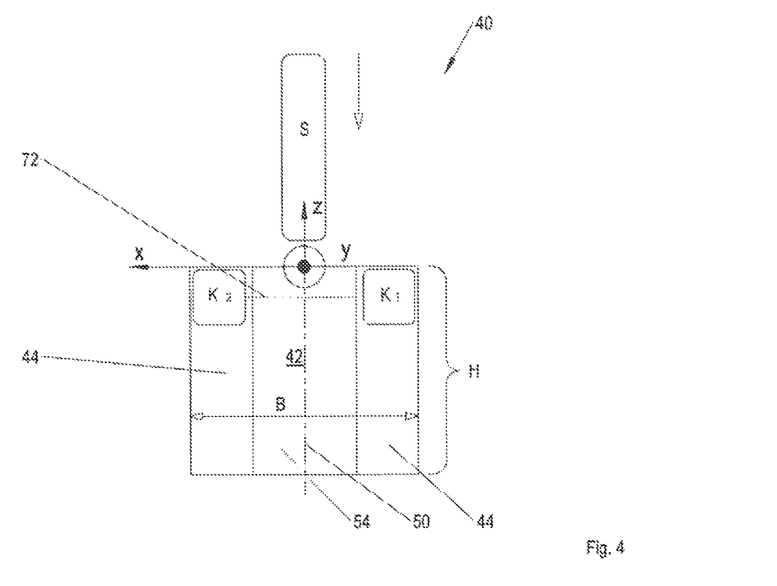
FIG. 4 is a side view of the device from FIG. 3 comprising a slider in a resting position.
Figure 5:
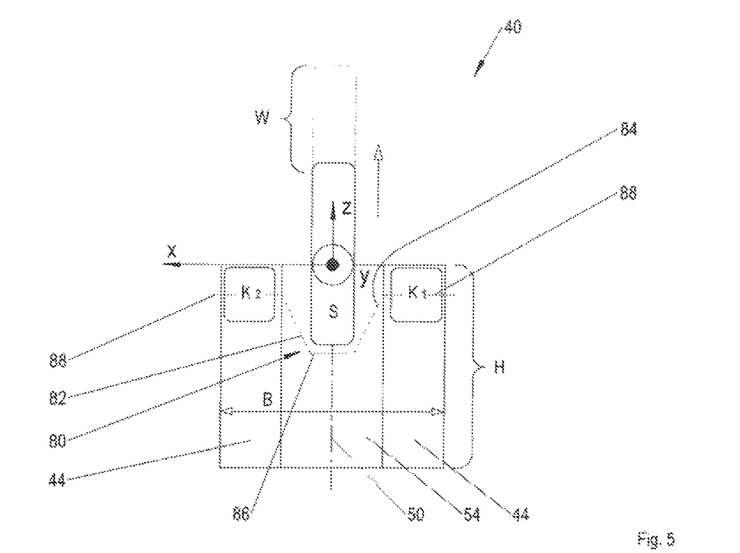
FIG. 5 shows the device from FIG. 4 with the slider in an operating position for forming a reinforcement strand loop.

FIGS. 4 and 5, to which reference is also made later in the description, illustrate a side view of the device from FIG. 3, the slider moving axially out of the resting position thereof according to FIG. 4 and into an operating position according to FIG. 5 to produce a reinforcement strand loop.

A width B of the lateral face 44 and of the two other lateral faces (not visible here) of the profile body 42 approximately corresponds by way of example to a height H of the profile body 42. In the position from FIG. 4, the slider S is located in the resting position thereof, i.e. in a position in which the slider is completely pulled out of the recess 54 of the profile body 42. The reinforcement strand 72 is fixed to the profile body 42 by the clamp $K_1$, whereas the clamp $K_2$ is still open. The same applies to the clamps $K_{3,4}$ which are covered here (cf. in particular FIG. 3), and therefore the reinforcement strand 72 can pass through the clamps $K_{2,3,4}$ in a resistance-free manner. During the axial movement of the slider S, the reinforcement strand 72 is thus further removed from the feeder (not shown here) (cf. in particular FIG. 3).

To produce a reinforcement strand loop 80, the slider S is moved in parallel with the z-axis in the direction of a small black arrow, i.e. towards the profile body 42, until the slider S has occupied the operating position shown by way of example in FIG. 5, and an approximately trapezoidal reinforcement strand loop 80 comprising a first and a second branch 82, 84 and a base portion 86 connecting the branches is produced. The slider S is axially driven into the recess 54 in the profile body 42 until the reinforcement strand loop 80 reaches the desired dimensions, in particular a defined overall length. By varying the path W covered by the slider S when forming the loop, the overall length of the reinforcement strand loop 80 produced or of a portion 88 separated from the reinforcement strand 80 can easily be set to a predefined measurement.

After producing the reinforcement strand loop 80, at least the clamp $K_3$ is still activated or tightened, as a result of which a new, free end of the reinforcement strand 72, which is produced after the process of separating the reinforcement strand loop 80, is secured to the profile body 42.

Finally, one of the separators $T_{1,2,3}$, which is likewise covered here, is actuated in a suitable manner so that the finished reinforcement strand loop 80 can be lifted from a needle and/or a gripper of the multi-needle system and pulled through a component made of foamed plastics material (cf. in particular FIG. 1).

Figure 6:
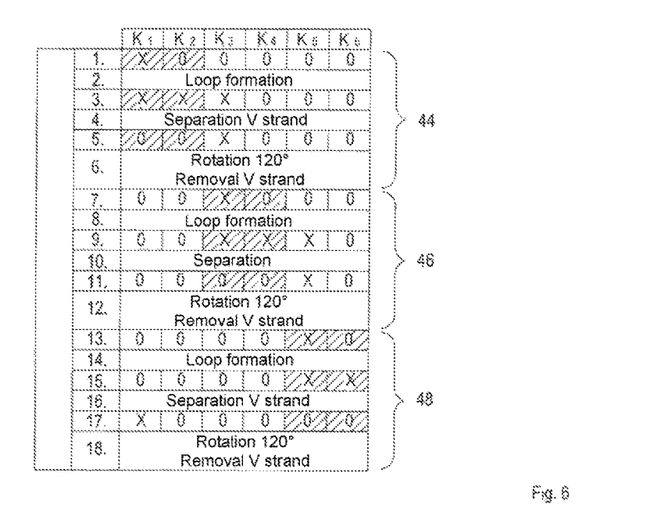
FIG. 6 is a table for explaining the method procedure for producing a reinforcement strand loop by the device from FIG. 1 through 5.

FIG. 6 is a table for explaining the method procedure for producing a reinforcement strand loop by the device from FIG. 1 through 5. In the position of the device according to FIG. 3, as shown in the first method step, the clamp $K_1$ is tightened first, whilst all the other clamps $K_{2,\ldots,6}$ are still open. An open clamp is denoted in the table by "0", whereas a tightened clamp is symbolised by "X". In the second method step, the reinforcement strand loop is produced ("loop formation") by actuating the slider, as explained with reference to FIGS. 4 and 5. In the third method step, in preparation for the separation process, the clamps $K_{2,3}$ are additionally tightened. In the fourth method step, the reinforcement strand is separated to produce the finished reinforcement strand loop for the multi-needle system by at least one of the associated separators $T_{1,2}$. In the fifth method step, the clamps $K_{1,2}$ are reopened, whilst the clamp $K_3$ remains tight, to allow the reinforcement strand to be removed from the feeder due to the subsequent rotation of the profile body. In the sixth method step, in the case of the triangular profile body, a rotation by an angular step of 120° ("rotation 120°") takes place, the reinforcement strand being further removed from the feeder at the same time ("removal V strand"). After the sixth method step has finished, an additional lateral face of the profile body in turn extends in parallel with the xz-plane of the coordinate system.

In the seventh method step, the clamp $K_3$ remains tightened so that another loop formation can take place in the eighth method step. The method steps 9 to 12 correspond to the method steps 3 to 6, the clamps $K_{3,\ldots,5}$ and at least one of the associated separators $T_{2,3}$, however, being activated. Accordingly, the same applies to the method steps 13 to 18, in which the clamps $K_5$, $K_6$, $K_1$ and at least one of the associated separators $T_{1,3}$ are involved. When the 18th method step finishes, the device is once again in the position from FIG. 3, and another run through the method can take place according to the table starting with the 1st method step. In general, in the case of a straight, prismatic profile body having for example n=3 (three) lateral faces 44, 46, 48 (cf. in particular FIGS. 2 and 3), the clamps $K_{2*i-1, 2*i}$, the separators $T_i$ and optionally an additional clamp $K_{2*i+1}$ for fixing a new start of a reinforcement strand, where i=1, 2, 3, are activated cyclically one after the other over the course of the method steps, the index being no greater than 6. In the method steps 1 through 6, 7 through 12 and 13 through 18, in each case, one of the lateral faces 44, 46, 48 extends in parallel with the xz-plane of the coordinate system.

Figure 7:
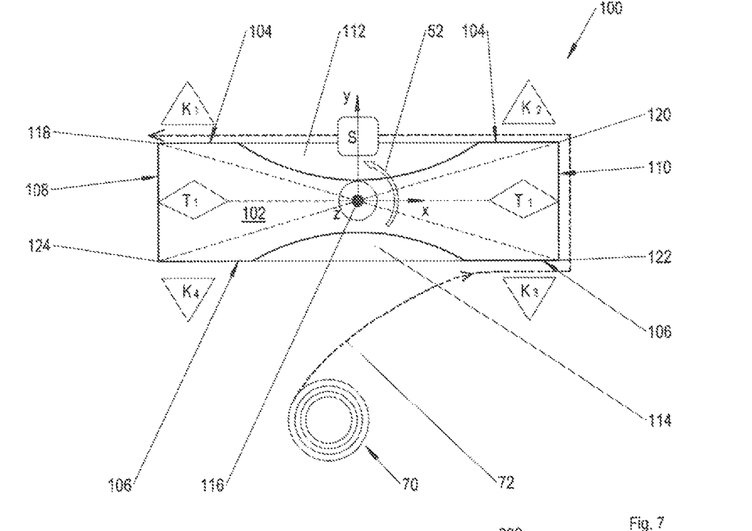
FIG. 7 is a schematic plan view of a second embodiment of the device.

FIG. 7 is a highly schematic plan view of a second embodiment of the device. The device 100 comprises inter alia a cuboid profile body 102 having a rectangular cross-sectional geometry. The profile body 102 has two long sides 104, 106 extending in parallel at a distance from one another, and two short sides 108, 110 extending in parallel at a distance from one another, which adjoin one another at four longitudinal edges 118, 120, 122, 124. Two continuous recesses 112, 114 for the longitudinally movable slider S are provided in the center of the two long sides 104, 106. On both sides of the concave curved recesses 112, 114, in each case, the clamps $K_{1,2}$ and $K_{3,4}$ are arranged on the periphery of the profile body 102. Furthermore, two separators $T_{1,2}$ for separating the reinforcement strand after loop formation are integrated in the profile body 102. The separators $T_{1,2}$ are positioned in each case centrally between the longitudinal edges 118, 124 and 120, 122 and at the level (z-axis) of the reinforcement strand 72 inside the profile body 102 so that the separators $T_{1,2}$ can cut through the reinforcement strand. The reinforcement strand 72 is guided onto the profile body 102 by the feeder 70 or further removed from the feeder 70 thereby during a rotation of the profile body 102 in the direction of the arrow of rotation 52.

The production of a reinforcement strand loop takes place analogously to the procedure described as part of the explanation of FIG. 1 through 6, the profile body 102 deviating therefrom being rotated in each case in angular steps of 180° about the z-axis of the coordinate system or the central longitudinal axis 116 thereof, as indicated by the arrow of rotation 52, and the clamps $K_{1,\ldots,4}$ and at least one of the two associated separators $T_{1,2}$ being activated accordingly.

Figure 8:
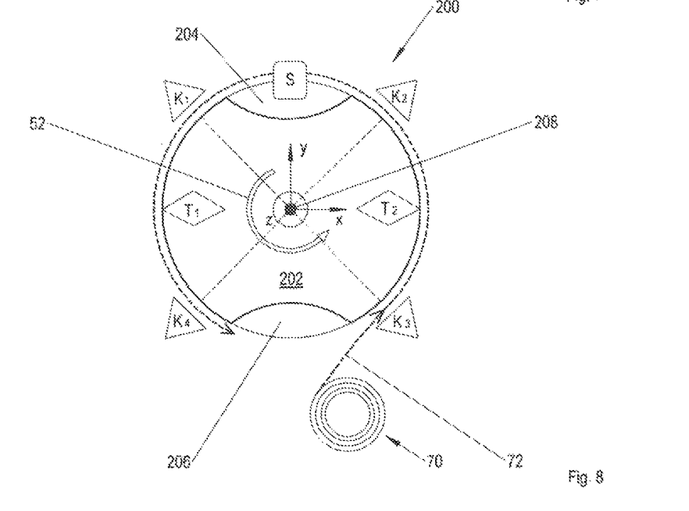
FIG. 8 is a schematic plan view of a third embodiment of the device.

FIG. 8 is a schematic plan view of a third embodiment of the device. A device 200 comprises inter alia an approximately cylindrical profile body 202, in which two recesses 204, 206 are arranged in a diametrically opposing manner so as to produce an approximately circular cross-sectional geometry of the profile body 202. Preferably, on both sides of the two concave curved recesses 204, 206, in each case, two clamps $K_{1,2}$ and $K_{2,3}$ are positioned on the periphery of the profile body 202. In each case, one separator $T_1$, $T_2$ is positioned on the periphery centrally between the clamps $K_1$, $K_4$ and $K_2$, $K_3$. The separator $T_1$ is arranged in the profile body 202 so as to be offset by 90°, starting from the recess 204, in the direction of the arrow of rotation 52, whereas the separator $T_2$ is arranged on the profile body 202 diametrically to the separator $T_2$. The reinforcement strand 72 is fed to the device 200 again by the feeder 70. The production of a reinforcement strand loop takes place analogously to the procedure described as part of the explanation of FIG. 1 through 6, the cylindrical profile body 202 according to the second embodiment, comprising a cuboid profile body, being rotated in each case in angular steps of 180° in each case about the z-axis of the coordinate system or the central longitudinal axis 208 thereof, as indicated by the arrow of rotation 52, the clamps $K_{1,\ldots,4}$ and the two separators $T_{1,\ldots,2}$ being activated accordingly.

Figure 9:
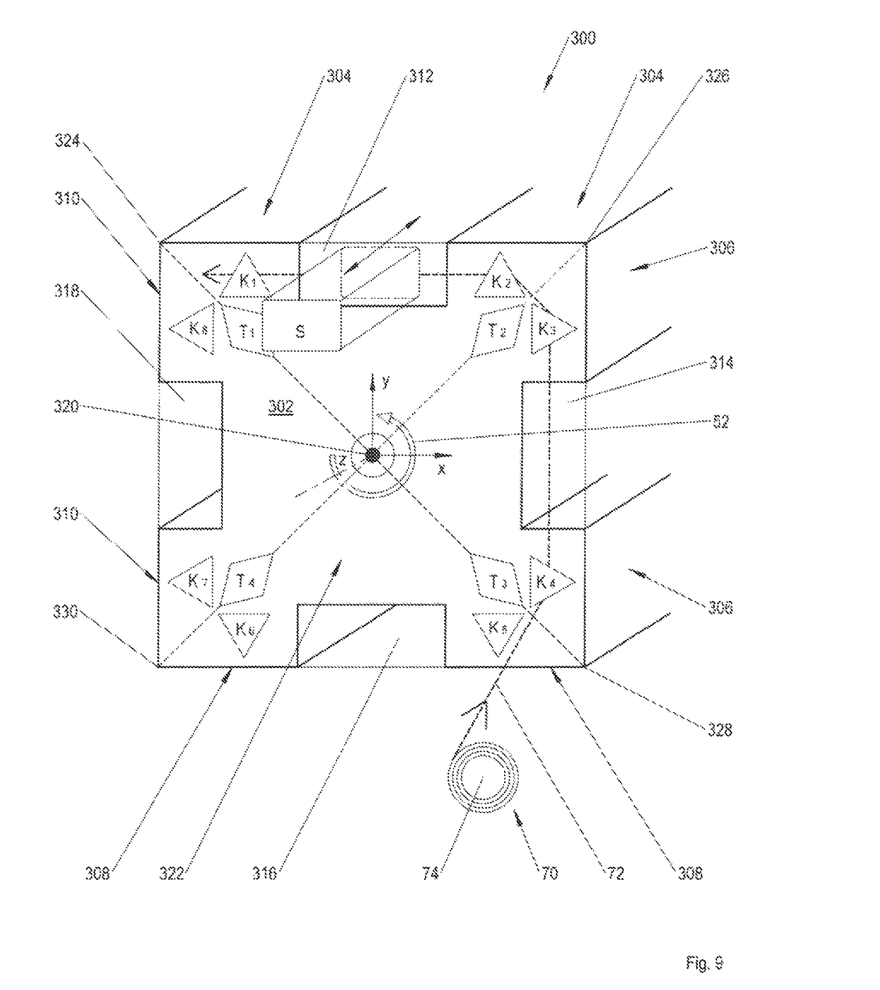
FIG. 9 is a schematic plan view of a fourth embodiment of the device.

FIG. 9 is a perspective view of a fourth embodiment of the device. A device 300 comprises a regular prismatic profile body 302 having four lateral faces 304, 306, 308, 310 and an approximately square cross-sectional geometry.

In the center of each lateral face 304, 306, 308, 310, a recess 312, 314, 316, 318 which in this case, by way of example, is in the shape of a groove, extends in parallel with the z-axis of the coordinate system or a central longitudinal axis 320 of the profile body 302 for the slider S. The recesses 312, 314, 316, 318 extend in this case over the entire height of the profile body 302 along the z-axis. The slider S can again be moved in the direction of the black double arrow in parallel with the central longitudinal axis 320 or the z-axis.

Deviating from all the other embodiments explained above, in this fourth embodiment of the device, the eight clamps $K_{1,\ldots,8}$ and the associated four separators $T_{1,\ldots,4}$ are not positioned on the periphery, but rather in the region of a (front) end face 322 of the profile body. In this case, preferably in each case two clamps $K_{1,2}$, $K_{3,4}$, $K_{5,6}$ and $K_{7,8}$ are positioned in each case symmetrically on both sides of each of the altogether four recesses 312 to 318. Furthermore, in this fourth embodiment, a total of four separators $T_{1,\ldots,4}$ are positioned between in each case two adjacent clamps $K_{8,1}$, $K_{2,3}$, $K_{4,5}$, $K_{6,7}$ or in the region of four outer corners 324, 326, 328, 330 of the end face 322 of the profile body 302. Accordingly, the clamps $K_{8,1}$, $K_{2,3}$, $K_{4,5}$, $K_{6,7}$ are located on the periphery in each case symmetrically on both sides of one of the corners 324, 326, 328, 330.

The advantage of this fourth embodiment of the device according to the disclosure herein lies in particular in the fact that an activation of the clamps $K_{1,\ldots,8}$ and of the separators $T_{1,\ldots,4}$ can be implemented in a simpler manner in terms of construction by eccentric shafts. In the case of this embodiment, the clamps $K_{8,1}$, $K_{2,3}$, $K_{4,5}$, $K_{6,7}$ are radially open towards the outside, resulting in the additional advantage that the reinforcement strand 72 is automatically threaded during rotation of the profile body 102.

The production of a reinforcement strand loop takes place again analogously to the procedure described as part of FIG. 1 through 6, the profile body 302 deviating therefrom being rotated in each case in angular steps of 90° in each case about the z-axis of the coordinate system or the central longitudinal axis 320 thereof, as indicated by the arrow of rotation 52, and the clamps $K_{1,\ldots,8}$ and the separators $T_{1,\ldots,4}$ being activated accordingly.

In the case of another embodiment (not shown in the drawings) of the device, the slider S can revolve about the stationary profile body 302 for example in four angular steps of 90° in each case, until the slider is positioned in each case in front of one of the four recesses 312, 314, 316, 318 of the profile body 302 to form a loop. After a complete revolution of the slider S, either the profile body 302 rotates by a full turn about the central longitudinal axis 320 thereof, or the feeder 70 revolves once about the stationary profile body 302, the reinforcement strand 72 at the same time being further removed from the supply spool 74 and placed on the profile body 302.

Furthermore, an independently activatable slider S can be assigned to each recess 312, 314, 316, 318. Furthermore, the feeder can revolve about a stationary profile body comprising a slider S which is oriented in a fixed manner on the periphery relative to the recess thereof for tracking the reinforcement strand. Furthermore, the profile body can also undergo a movement relative to the slider in parallel with the central longitudinal axis thereof.

As a result, by the device according to the disclosure herein, reinforcement strand loops can be produced with short cycles, high dimensional accuracy and good reproducibility and presented to a multi-needle system connected downstream to reinforce components made of foamed plastics material.

The disclosure herein relates to a device 40, 100, 200, 300 for providing reinforcement strand loops 14, 80 for a multi-needle system 12 for mechanically reinforcing a component 10 made of a foamed plastics material, having the following features:
  a. a profile body 42, 102, 202, 302;
  b. at least two clamps $K_{1,\ldots,8}$ positioned on the periphery and/or end face of the profile body 42, 102, 202, 302 for fixing a reinforcement strand 72 to the profile body 42, 102, 202, 302;
  c. at least one slider S which can be moved in parallel with a central longitudinal axis 50, 116, 208, 320 of the profile body 42, 102, 202, 302 to produce a reinforcement strand loop 14, 80;
  d. at least two separators $T_{1,\ldots,4}$ positioned in the periphery and/or end face of the profile body 42, 102, 202, 302 for separating the reinforcement strand loop 14, 80 from the reinforcement strand 72; and
  e. a feeder 70 for feeding the reinforcement strand loop 14, 80.

As a result, reinforcement strand loops can be produced with high precision and individually presented to the needles and/or grippers of a multi-needle system 12.

Furthermore, the device can be integrated in multi-needle system 12 of this type in a compact manner. Furthermore, the disclosure herein relates to a method.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for providing reinforcement strand loops for a multi-needle system for mechanically reinforcing a component made of a foamed plastics material, the device comprising:
   a profile body;
   at least two clamps positioned on a periphery and/or an end face of the profile body for fixing a reinforcement strand to the profile body;
   at least one slider that is movable in parallel with a central longitudinal axis of the profile body to form the reinforcement strand loops;
   at least two separators positioned in the periphery and/or the end face of the profile body for separating the reinforcement strand loops from the reinforcement strand; and
   a feeder for feeding the reinforcement strand to the profile body.

2. The device of claim 1, wherein the profile body is rotatable about the central longitudinal axis.

3. The device of claim 1, wherein the profile body is rotatable about the central longitudinal axis thereof in angular steps of 360°/n, n being a natural number which is greater than or equal to two.

4. The device of claim 1, wherein, in a resting position, the separators are flush with the profile body and, in an operating position, the separators protrude at least in part from the profile body.

5. The device of claim 1, wherein a clamping unit is assigned to the feeder.

6. The device of claim 1, wherein the clamps are actuatable by one or more eccentric shafts.

7. The device of claim 1, comprising at least one additional clamp arranged on the periphery of the profile body.

8. The device of claim 1, wherein:
   the profile body has an approximately straight prismatic shape having at least three lateral faces;
   each of the at least three lateral faces comprises a recess, which extends through a center thereof and in parallel with the central longitudinal axis, for at least partially receiving the slider;
   two clamps are positioned on the profile body on both sides of each recess; and
   at least one separator is integrated in a region of respective longitudinal faces of each of the at least three lateral faces of the profile body.

9. The device of claim 1, wherein:
   the profile body has an approximately cuboid shape comprising two long sides and two short sides;
   each of the two long sides of the profile body comprises a recess, which extends through a center thereof and in parallel with the central longitudinal axis, for at least partially receiving the slider;
   two clamps are positioned on the profile body in a region of each of the two long sides on both sides of each recess; and
   at least one separator is integrated in each of the short sides of the profile body.

10. The device of claim 1, wherein:
    the profile body has an approximately cylindrical shape;
    the profile body comprises two diametrically arranged recesses, which extend in parallel with the central longitudinal axis, for at least partially receiving the slider;
    two clamps are positioned on the profile body on both sides of each of the recesses; and
    a separator is integrated in the profile body between adjacent clamps.

11. The device of claim 1, wherein:
    the profile body has an approximately straight prismatic shape having at least three lateral faces;
    each of the at least three lateral faces comprises a recess, which extends through a center thereof and in parallel with the central longitudinal axis, for at least partially receiving the slider;
    two clamps are positioned on an end face of the profile body on both sides of each recess; and
    at least one separator is integrated in a region of a corner of each of the at least three lateral faces of the profile body.

12. A method for providing reinforcement strand loops for a multi-needle system for mechanically reinforcing a component made of a foamed plastics material, the method comprising steps of:
    a. fixing, using a first clamp, a first branch of the reinforcement strand loop to a profile body;
    b. moving a slider in parallel with a central longitudinal axis of the profile body to produce the reinforcement strand loop;
    c. fixing, using a second clamp positioned on a periphery of the profile body at a distance from the first clamp, a second branch of the reinforcement strand loop to the profile body;
    d. separating, using at least one separator, the reinforcement strand loop, the first and second branches of which are clamped between the first and second clamps, respectively, from the reinforcement strand such that a needle and/or a gripper of the multi-needle system can receive the reinforcement strand loop;
    e. tracking an amount of the reinforcement strand passing about the profile body; and
    f. repeating steps a through e.

13. The method of claim 12, wherein the method is performed by a device comprising:
    a. a profile body;
    b. at least two clamps positioned on the periphery and/or an end face of the profile body;
    c. at least one slider movable in parallel with the central longitudinal axis of the profile body;
    d. at least two separators positioned on the periphery and/or the end face of the profile body; and
    e. a feeder for feeding the reinforcement strand loop to the profile body.

14. The method of claim 12, wherein tracking the amount of the reinforcement strand in step e) comprises rotating the profile body by an angular step of 360° divided by n to simultaneously pull the reinforcement strand off a feeder, n being a natural number which is greater than or equal to 2.

15. The method of claim 12, wherein, in step d), the reinforcement strand is fixed to the profile body by at least one additional clamp before the reinforcement strand loop is separated.

16. The method of claim 12, comprising adjusting an axial path of the slider, starting from a resting position thereof up to and including an operating position thereof, such that the reinforcement strand loop produced has a predetermined length.

17. The device of claim 5, wherein the clamping unit is for homogenizing mechanical stress of the reinforcement strand.

18. The device of claim 1, wherein the slider is movable relative to the profile body.

19. The method of claim 12, comprising actuating the one or more of the first and second clamps by one or more eccentric shafts.

20. The method of claim 13, comprising homogenizing, using a clamping unit assigned to the feeder, mechanical stress of the reinforcement strand.

* * * * *